United States Patent [19]

Hall

[11] 4,392,215
[45] Jul. 5, 1983

[54] PEST CONTROL APPARATUS

[75] Inventor: Lester B. Hall, Kenmore, N.Y.

[73] Assignee: Gary Lester Hall, Kenmore, N.Y.

[21] Appl. No.: 887,601

[22] Filed: Mar. 17, 1978

Related U.S. Application Data

[63] Continuation-in-part of Ser. No. 840,536, Oct. 11, 1977, Pat. No. 4,178,578.

[51] Int. Cl.³ .............................................. H04B 1/02
[52] U.S. Cl. ..................................................... 367/139
[58] Field of Search ............................. 340/15, 384 E; 116/22 A; 43/124; 339/147 P, 154 L, 161, 167, 168, 169; 367/139

[56] References Cited

U.S. PATENT DOCUMENTS

| | | | |
|---|---|---|---|
| 3,328,908 | 7/1967 | Moe | 340/15 |
| 3,503,039 | 3/1970 | Aniskovicz | 340/15 |
| 3,517,226 | 6/1970 | Jones, Sr. | 340/15 |
| 3,636,559 | 1/1972 | Grande et al. | 340/384 E |
| 3,872,472 | 3/1975 | Moschgat | 340/15 |
| 3,879,702 | 4/1975 | Mancone | 340/15 |

FOREIGN PATENT DOCUMENTS

511318  8/1939  United Kingdom .

Primary Examiner—Theodore M. Blum
Attorney, Agent, or Firm—Christel, Bean & Linihan

[57] ABSTRACT

Ultrasonic pest control apparatus comprising an elongated housing having opposite ends, a sound generator carried by the housing adjacent one end thereof and including at least one transducer for providing output sound waves when driven by an electrical signal, the sound waves being directed outwardly from the end of the housing and having a frequency normally inaudible to humans and intolerable by pests such as rodents and the like, and an electrical connector element at the other end of the housing adapted to be inserted manually into a standard electrical outlet receptacle commonly found in buildings and the like. The connector can be of the prong type or of the threaded type commonly found on the base of electric lamps. The transducer preferably is driven in a manner such that the generated sound waves are a composite output in the form of a random pattern of harmonies.

9 Claims, 10 Drawing Figures

PEST CONTROL APPARATUS

CROSS REFERENCE TO A RELATED APPLICATION

This application is a continuation-in-part of my pending application Ser. No. 840,536 filed October 11, 1977 and entitled "Pest Control Apparatus" now U.S. Pat. No. 4,178,578 issued Dec. 11, 1979.

BACKGROUND OF THE INVENTION

This invention relates to the art of controlling pests such as rodents and the like, and more particularly to a new and improved apparatus for generating and radiating ultrasonic waves for controlling such pests.

It has been discovered that ultrasonic sound waves at a frequency normally inaudible to humans can be effective to repel pests such as rodents and the like. In the design of apparatus for generating and radiating ultrasonic sound waves for controlling such pests, there are a number of important factors to be considered. The sound waves should be emitted in a manner providing maximum stress and irritation to the pests while at the same time being consistent with human safety. It would be highly desirable to provide such apparatus which can be installed both mechanically and electrically with little or no alterations or modifications to existing building structures or environments where the apparatus is to operate.

SUMMARY OF THE INVENTION

It is, therefore, an object of this invention to provide a new and improved apparatus for generating and radiating ultrasonic sound waves for the control of pests such as rodents and the like.

It is a further object of this invention to provide such apparatus which can be installed mechanically and electrically with minimal or no modifications to existing structures.

It is a further object of this invention to provide such apparatus which can be installed by hand in a routine manner.

It is a further object of this invention to provide such apparatus which is relatively simple in construction and economical to manufacture and use.

The present invention provides apparatus for generating and radiating ultrasonic sound waves for the control of pests such as rodents and the like comprising an elongated housing having two ends, electrically-operated sound generating means carried by the housing adjacent one end thereof for providing output sound waves directed outwardly from the end of the housing and in an ultrasonic frequency range normally inaudible to humans and intolerable by pests such as rodents and the like, and an electrical connector at the other end of the housing adapted to be inserted manually into a standard electrical outlet receptacle commonly found in buildings and the like for supplying electricity to the sound generating means and simultaneously supporting and holding the apparatus. The connector can be of the prong type or of the threaded type commonly found on the base of electric lamps. The sound generating means can comprise at least one transducer having a natural frequency of oscillation, oscillator means for applying an electrical signal to the transducer at a signal frequency different from the transducer natural frequency, and timing means for controlling the oscillator duty cycle, thereby providing a composite output of sound waves in the form of a random pattern of frequencies and amplitude peaking.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENTS

In prior art apparatus for generating and radiating ultrasonic sound waves for the control of pests such as rodents and the like, a transducer is carried by a housing having a reflector fixed to one end of the housing, and an oscillator connected to the transducer applies to the transducer an electrical signal for producing ultrasonic sound waves normally inaudible to humans and irritating to the pests. An electrical supply cord leads away from the housing for connection to an electrical line located away or remote from the housing, and often some additional mechanical supporting or holding arrangement must be provided for the apparatus. In the apparatus according to the present invention, an elongated housing has two ends, typically opposite ends, an electrically-operated sound generator is carried by the housing adjacent one end thereof and positioned for providing output ultrasonic sound waves directed outwardly away from the end of the housing, and an electrical connector is provided at the other end of the housing adapted to be inserted manually into a standard electrical outlet receptacle commonly found in buildings and the like for supplying electrical current to the sound generator and mechanically supporting the apparatus. The connector can be of the prong type or it can be of the threaded type commonly found on the base of electric lamps. The sound generating means can comprise at least one transducer having a natural frequency of oscillation, oscillation means for applying an electrical signal to the transducer at a signal frequency different from the transducer natural frequency, and timing means for controlling the oscillator duty cycle, thereby providing a composite output of sound waves in the form of a random pattern of frequencies and amplitude peaking.

Figure 1:
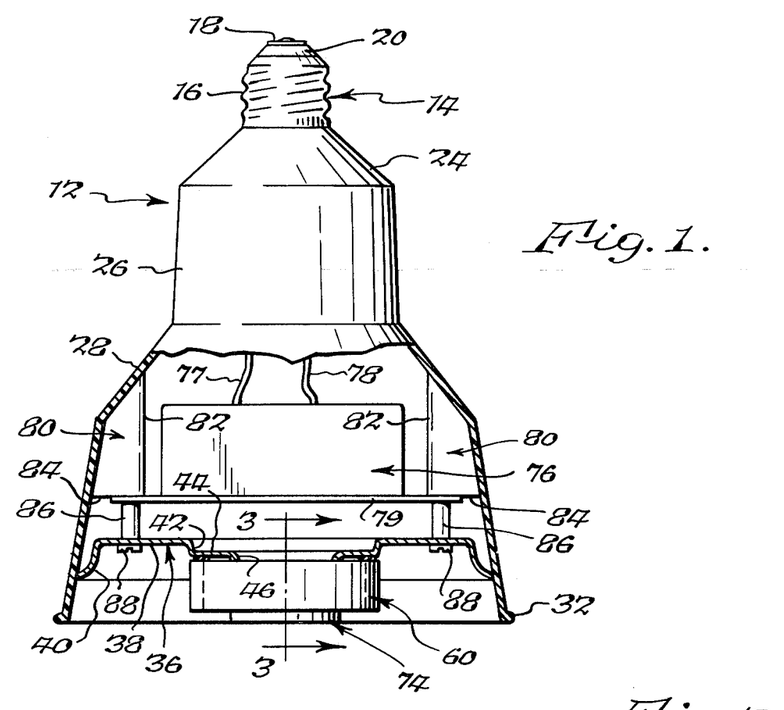
FIG. 1 is a side elevational view with parts removed and some parts in section of apparatus for generating and radiating ultrasonic sound waves for controlling pests in accordance with the present invention.

FIG. 1 shows pest control apparatus according to the present invention including a housing generally designated 12 which is somewhat elongated in overall shape, having a longitudinal axis and opposite ends. Housing 12 is provided with an electrical connector element generally designated 14 at one end thereof which is adapted to be inserted manually into a standard electrical outlet receptacle commonly found in buildings and the like. In the device shown connector 14 is of the type commonly found on the base or ends of electric lamps or light bulbs and includes a generally cylindrical conductive portion 16 of metal provided with external threads whereby it can be screwed by hand into a conventional socket, a separate conductive element 18 of metal generally in the form of a contact button or disc at the outer end face thereof, and a body of insulative material 20 separating the threaded portion 16 from the contact 18. Connector 14 is fixed at the end of housing 12 and disposed such that the longitudinal axis of the cylindrical or sleeve portion 16 is substantially coincident with the longitudinal axis of the housing 12, the contact 18 is disposed in a plane generally perpendicular to the longitudinal axes of housing 12 and cylinder 16, and the center of contact 18 is generally coincident with the common axes.

The housing 12 includes a first annular wall portion 24 extending from connector 14 and increasing in diameter along the longitudinal axis of housing 12 in a direction away from connector 14. The portion 24 is of generally conical formation having an overall longitudinal length slightly less than the length of connector 14. The portion 24 meets one end of another housing portion or section 26 of substantially cylindrical shape but of slightly increasing diameter in a direction longitudinally along the axis of housing 12 and axially away from section 24. The longitudinal length of section 26 is slightly more than twice that of section 24. Section 26, in turn, meets another housing section 28 of increasing diameter in a direction axially away from section 26 and having an overall length less than the length of section 26 but greater than the length of section 24. Sections 28 and 24 describe relative to the longitudinal axis of the housing 12 substantially similar angles. In other words, sections 24 and 28 increase in diameter at substantially the same rate. Section 28 meets another housing wall section 30 of relatively more gradually increasing diameter in a direction axially away from section 28. Section 30 is of a length approximately two and one-half that of section 28, and it terminates in an annular bead 32 which defines the opposite end of housing 12. The circular area or region defined by bead 32 has a diameter approximately five times the diameter of cylindrical portion 16 of connector 14.

The end of housing 12 adjacent bead 32, i.e. axially opposite the connector 14, receives an element generally designated 36 which closes the interior of housing 12 and serves as a base or supporting means for other components of the system in a manner which will be described. The element 36 includes a main body portion 38 which is planar, somewhat disc-shaped and which is formed to include a circumferential annular rim or flange 40 having an outer diameter substantially equal to the inner diameter of the housing wall portion 30 at a short distance axially inwardly of the annular bead 32. Element 36 also is formed to include a first central cylindrical extension 42 of relatively short axial length extending in an axial direction toward the end of housing 12 containing bead 32 which meets a radially inwardly extending surface portioon 44 which, in turn, meets a second cylindrical extension 46 shown in further detail in FIG. 3 and extending in an axial direction toward bead 32. Extension 46 is of a diameter less than extension 42 but is of greater axial length. The extension 46 meets a radially inwardly extending flange portion 48 having a central opening 50 therein. The element 36 can be joined to the housing 12 in various suitable ways, one of which will be described presently.

Figures 2, 3:
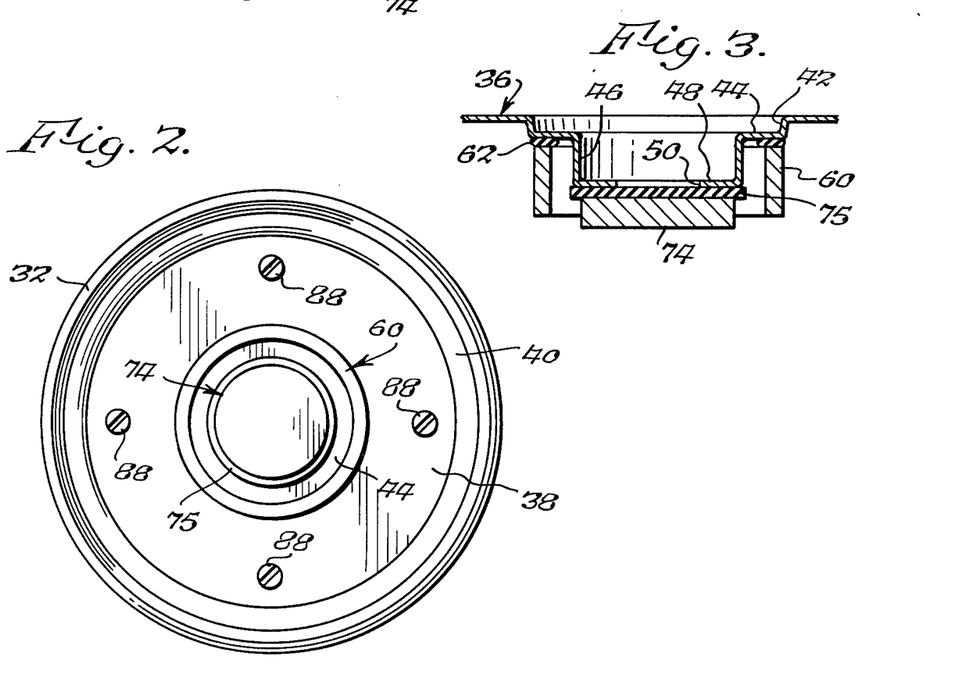
FIG. 2 is a plan view of the apparatus of FIG. 1.
FIG. 3 is a sectional view taken about on line 3—3 in FIG. 1.

The apparatus of the present invention further comprises first transducer means in the form of a ring 60 carried by the supporting element 36 and having a natural frequency of oscillation. Transducer 60 functions to provide output sound waves in the ultrasonic range when energized by an appropriate electrical signal in a manner which will be described in detail presently. The annular-shaped transducer 60 is disposed with the longitudinal axis thereof generally coincident with the longitudinal axis of housing 12. Transducer 60 is located on the side of supporting element 36 facing outwardly in the direction of the outer annular bead 32, and in the apparatus shown transducer 60 is generally outwardly concentric with respect to extension 46. In addition, transducer 60 is movably carried by the supporting element 36 in a manner allowing a limited degree of movement in an axial direction. In particular, transducer 60 is mounted by means of an annular ring 62 of resilient material. The material of ring 62 should provide a cushioning or resilient type of mounting for transducer 60 and be of a nature such that it does not absorb moisture, i.e. is water resistant. One form of material found to perform satisfactorily is 40 durometer neoprene rubber. As shown in FIG. 3, the rubber ring 62 has an inner diameter greater than the outer diameter of extension 46 and has an outer diameter substantially equal to the outer diameter of extension 42. Opposite faces of the ring 62 are secured to the outer surface of the flange portion 44 and to the annular end face of transducer 60 by suitable bonding material, for example a 732 RTV silicone rubber cement commercially available from Dow Corning under the registered trademark Silastic.

The apparatus of the present invention further comprises second transducer means generally designated 74 and also carried by the supporting element 36. Transducer 74 has a natural frequency of oscillation and functions to provide output sound waves in the ultrasonic range when energized by an appropriate electrical signal in a manner which will be described in detail presently. Transducer 74 is in the form of a disc disposed in a plane generally perpendicular to the longitudinal axis of housing 12 and is located within the transducer 60. In particular, transducer 74 is positioned generally centrally of transducer 60 with the longitudinal axis thereof generally coincident with the longitudinal axis of housing 12. Transducer 74 is of the diaphragm type and is movably carried by element 36 in a manner allowing a limited degree of movement in an axial direction. The mounting means for transducer 74 comprises a disc-shaped element 75 of a diameter slightly larger than that of the transducer 74 having one surface thereof fixed to a surface of transducer 74 and having the opposite surface thereof fixed to the outer surface of the radial flange 48. The mounting element 75 is of a suitable resilient material, for example rubber, which is fixed to transducer 74 and surface 48 by suitable means, for example the aforementioned silicone rubber cement.

The apparatus of the present invention further comprises driver means 76 electrically connected to the first and second transducers 60 and 74, respectively, for applying electrical signals to the transducers in a manner causing them to provide output sound waves in a manner which will be described. In the apparatus shown in FIG. 1, the driver means is represented diagramatically at 76 and is positioned within the housing 12. The driver means comprises appropriate electrical components and circuitry which will be described in detail presently, and as shown in FIG. 1 driver means 76 is connected by electrical lines 77, 78 to the electrical connector 14, in particular to corresponding ones of the contact portions 16 and 18. The driver means 76 is attached to a supporting plate 79 which, in turn, is positioned in spaced, generally parallel relation to the supporting element 36, and both are mounted or joined to housing 12 in the following manner. Located around about the inner surface of housing 12 adjacent portions 28, 30 are a plurality, two of which are shown in FIG. 1, of mounting bodies or extensions each designated 80 having a first inner surface 82 which is disposed generally parallel to the longitudinal axis of housing 12 and a second inner surface 84 disposed in a plane generally perpendicular to the longitudinal axis of housing 12. The elements 80 are of a size such that the surfaces 82 allow sufficient room therebetween to accomodate the size of the driver means 76. The driver supporting plate 79 is placed in seating contact against the surfaces 84 as shown in FIG. 1, a plurality of spacer elements or sleeves 86 are placed between supporting plate 79 and supporting element 36, and the combination of supporting element 36 and plate 79 are mounted to the members 80 by means of screws 88 which are received in the spacers 86 extending from the element 36 through the mounting plate 79 and into the bodies 80. Other mounting arrangements can of course be employed for joining supporting element 36 and plate 79 in spaced relation to the interior surface of housing 12.

Figure 4:
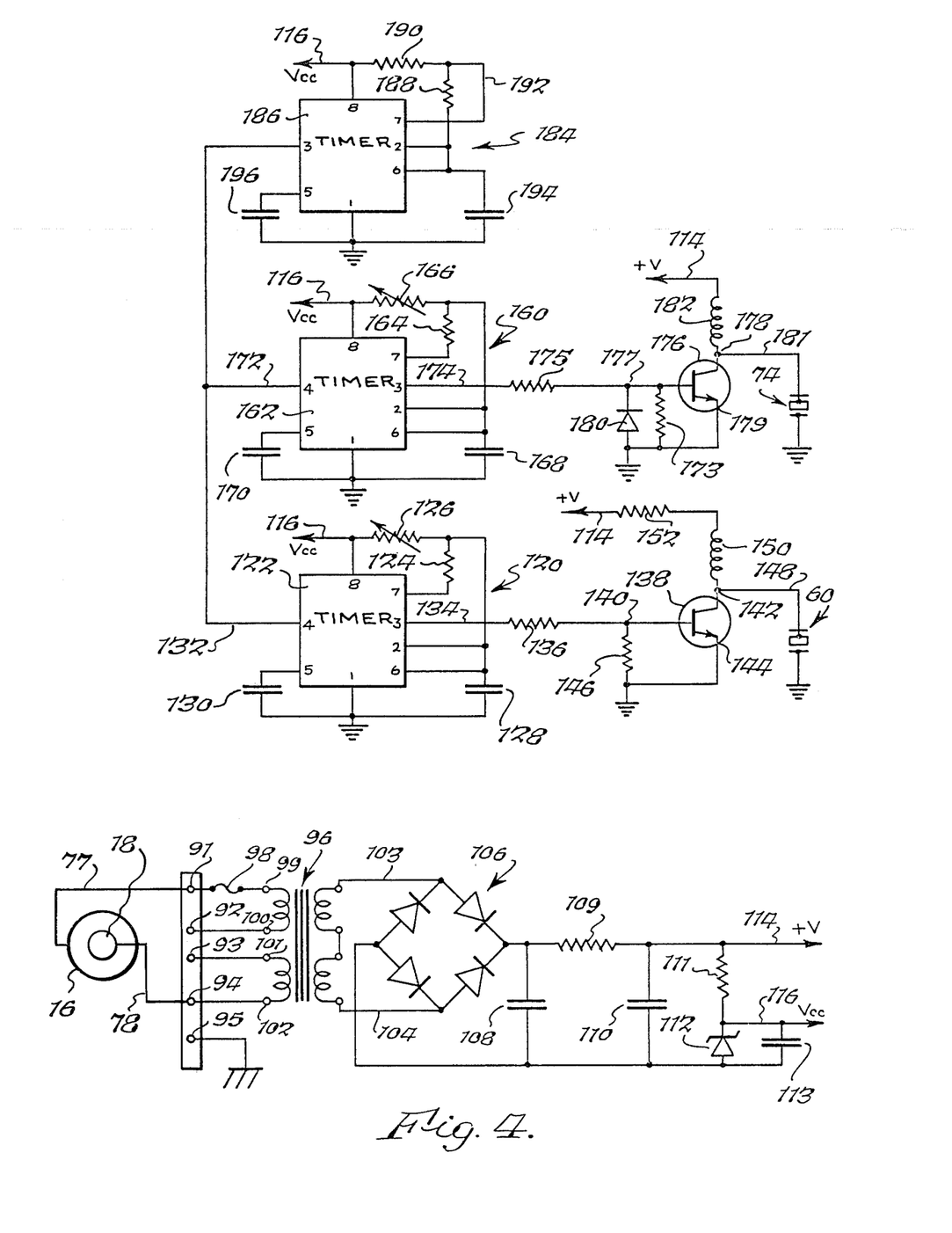
FIG. 4 is a schematic circuit diagram of the sound generating means of the apparatus of FIG. 1.

The electrical circuit of driver means 76 is illustrated in FIG. 4, and electrical power for operating the driver means is provided by a power supply which is connected by connector element 14 when inserted in an electrical outlet receptacle to a standard 120 volt or 240 volt a.c. line. In particular, the power supply includes an input terminal strip containing terminals 91-95, and lines 77 and 78 connect terminals 91 and 94, respectively, to portions 16 and 18 of the electrical connector element 14. In the circuit shown, if a jumper wire is connected joining terminals 92 and 93 the system operates from a 240 volt line, and if jumper wires are connected joining terminals 91 and 93 and joining terminals 92 and 94 the circuit operates from a 120 volt line. Terminals 91-94 are connected to the primary winding of a transformer 96, and terminal 95 is the ground terminal. In particular, terminal 91 is connected through a fuse 98 to transformer terminal 99, and terminals 92-94 are connected to transformer primary terminals 100-102, respectively. The secondary winding of transformer 96 is connected by lines 103, 104 to a full wave diode bridge rectifier 106, the output of which is connected to one terminal of a capacitor 108, the other terminal which is connected to the circuit ground or reference. The series combination of a resistor 109 and capacitor 110 is connected across capacitor 108. The series combination of resistor 111 and Zener diode 112 is connected across capacitor 110. Another capacitor 113 is connected across diode 112. The power supply provides two output voltage levels on lines 114, 116, and in the circuit shown the output voltage on line 114 is about 50 volts positive and the output voltage on line 116 is about fifteen volts positive.

By way of illustration, in the circuit shown, transformer 96 is commercially available from the Signal Transformer Co. under the designation DPC-34-300, and rectifier 106 is commercially available under the designation Erie FWB 3001A. Capacitors 108 and 110 both have a magnitude of about 220 microfarads, and resistor 109 has a magnitude of about 27 ohms. Resistor 111 has a magnitude of about 1.5 kilohms, capacitor 113 has a magnitude of 33 microfarads, and diode 112 has a breakdown voltage of about 15 volts.

The transducers 60 and 74 are shown schematically in FIG. 4, and the driver means according to the present invention comprises oscillator means generally designated 120 and drivingly coupled to the transducer 60 for applying to transducer 60 an electrical signal having a frequency different from the natural frequency of transducer 60. In particular, oscillator 120 includes an integrated circuit timer 122 which in the present illustration is the commercially available Signetics NE555 timer. The various terminal pin numbers of that particular timer are indicated in FIG. 4. Terminal number 1 is connected to the circuit electrical ground or reference, and terminal number 8 is connected to line 116 which provides the voltage Vcc. The series combination of a fixed resistor 124 and a variable resistor or potentiometer 126 is connected between the terminals 7 and 8 in the manner shown. Terminals 2 and 6 are connected together, a capacitor 128 is connected between terminals 6 and 1, and a capacitor 130 is connected between terminals 1 and 5. Terminal number 1 also is connected to the circuit ground or reference. Terminal 4 is connected by a line 132 to other components of the driving means in a manner which will be described.

The terminal designated 3 of timer 122 is the output, and it is connected by a line 134 to one terminal of a resistor 136, the other terminal of which is connected to a power transistor designated 138 which is of the NPN type having base, collector, and emitter terminals 140, 142 and 144 respectively. The other terminal of resistor 136 is connected to base terminal 140, emitter terminal 144 is connected to the reference or ground, and a resistor 146 is connected across the base and emitter terminals. The collector terminal of transistor 142 is connected to one terminal of the transducer 60, and the other terminal of transducer 60 is connected to the circuit reference or ground. The collector terminal 142 also is connected through the series combination of an inductor 150 and resistor 152 to line 114 providing the V positive voltage. One form of transducer 60 found to perform satisfactorily is available commercially from Edo Western Corp. of Salt Lake City, Utah under the designation EC-64 and having a natural frequency of oscillation of about 20.5 kilohertz. The frequency of the oscillator output signal on line 134 is set by potentiometer 126 to be about 1-3 percent greater than the transducer natural frequency as will be described in detail presently.

The driver means further comprises oscillator means generally designated 160 drivingly coupled to the transducer 74 for applying to the transducer an electrical signal having a frequency different from the natural frequency of transducer 74. Oscillator 160 includes an integrated circuit timer 162 which, like timer 122, is of the Signetics NE555 type wherein the terminal pin numbers of that particular device are indicated in FIG. 4. Terminal number 8 is connected to line 116 supplying the voltage Vcc, and terminal 7 is connected through the series combination of a fixed resistor 164 and a variable resistor or potentiometer 166 to terminal 8. Terminals 2 and 6 are connected together, terminal 6 is connected through a capacitor 168 to terminal 1, and terminal 1 is connected through a capacitor 170 to terminal 5. Terminal number 1 also is connected to the circuit reference or ground. Terminal number 4 is connected by a line 172 to other components of the driving means in a manner which will be described. The output of timer 162 is on terminal number 3 which is connected by a line 174 to one terminal of a resistor 175, the other terminal of which is connected to a power transistor 176 having base, collector and emitter terminals 177, 178 and 179, respectively. Resistor 175 is connected to base terminal 177. Emitter terminal 179 is connected to the circuit reference or ground, and a protective diode 180 is connected between the base and emitter terminals. Diode 180 conducts any negative spike to ground and protects against negative overshoot. A resistor 173 is connected across diode 180. The collector terminal 178 of the transistor is connected by a line 181 to one terminal of transducer 74, and the other terminal of transducer 74 is connected to the circuit reference or ground. The collector terminal 178 also is connected through an inductor 180 to line 114 which provides the voltage V positive.

One form of transducer 74 found to perform satisfactorily is available commercially from Linden Laboratories under the designation P/N 70120-23 and having a natural frequency of oscillation of about 24.3 kilohertz. The frequency of the oscillator output signal on line 174 is set by potentiometer 166 to be about 1-3 percent greater than the transducer natural frequency as will be described in detail presently.

The driver means further includes timing means generally designated 184 connected to controlling relation to the oscillators 120 and 160 for controlling the duty cycle of the oscillators. In other words, timer 184 functions to turn the oscillators on and off at predetermined intervals. In particular, the timing means 184 functions like a switch to turn the oscillators 120 and 160 on and off at a regular rate whereby the output signals from the oscillators are applied to the transducers in a controlled on and off manner. The timing means 184 includes an integrated circuit timer device 186 which, like the devices 122 and 162, is the commercially available Signetics NE555 timer. The terminals of the device are numbered corresponding to that particular commercial timer. Terminal number 8 is connected to line 116 which supplies the voltage Vcc. Terminals 2 and 6 are connected together, and terminal 2 is connected through the series combination of fixed resistors 188 and 190 to terminal 8. Terminal number 7 is connected by line 192 to the junction of the resistors 188, 190. Terminal 6 is connected through a capacitor 194 to terminal 1, terminal 1 is connected through a capacitor 196 to terminal 5, and terminal 1 is connected to the circuit ground or reference. The output of timer 186 is on terminal 3 which is connected by lines 132 and 172 to timers 122 and 162, respectively. The frequency of the square wave output of timer 186 is determined by the values of capacitor 194 and resistors 188, 190.

By way of illustration, in the circuit shown, resistor 124 has a magnitude of 33 kilohms, resistor 126 is a 100 kilohm potentiometer, capacitor 128 has a magnitude of 390 picofarads, capacitor 130 has a magnitude of 0.01 microfarads, resistor 136 has a magnitude of 3.3 kilohms, resistor 146 has a magnitude of 1 kilohm, inductor 150 has a magnitude of 18 millihenries, and resistor 152 has a magnitude of 152 ohms. Resistor 164 has a magnitude of 33 kilohms, resistor 166 is a 100 kilohm potentiometer, capacitor 168 has a magnitude of 330 picofarads, capacitor 170 has a magnitude of 0.01 microfarads, resistor 173 has a magnitude of 1 kilohm, resistor 175 has a magnitude of 1.5 kilohms, and inductor 182 has a magnitude of 10 millihenries. Resistor 188 has a magnitude of 220 kilohms, resistor 190 has a magnitude of 100 kilohms, capacitor 194 has a magnitude of 10 microfarads, and capacitor 196 has a magnitude of 0.01 microfarad. The transducers 60 and 74 are of the piezoelectric crystal type and having a capacitive reactance depending upon the particular transducer resonant frequency. Voltage V plus has a magnitude of 50 volts.

The apparatus of FIGS. 1-4 operates in the following manner. One or more units of apparatus is installed in a room or area from which it is desired to repel and eliminate pests such as rodents. Advantageously, each unit is installed simply by grasping it by hand and inserting the connector 14 into a standard internally threaded socket or receptacle commonly found on walls and ceilings of buildings and then rotating the entire device by hand to screw the connector 14 into the socket in a manner similar to installing an incandescent electric lamp or light bulb. When the connector 14 is tight in the socket outlet, an electric circuit is made from the supply line through connector portions 16 and 18 and leads 77 and 78, respectively to the power supply portion of the driver circuit 76. Advantageously, the mechanical engagement between connector 14 and the socket serves to hold or support the entire unit mechanically thereby avoiding the need to provide separate supporting arrangements. Each unit is installed in a manner to be disposed to direct the output ultrasonic sound waves generally in the region of the ground or floor where the rodents and like pests normally travel. Thus, the units typically would be screwed into sockets located on ceilings or on walls at a relatively low height near the floor. While an important advantage of the apparatus is the capability of installation in existing sockets in a building, additional sockets can of course be wired in the building or area at locations specially selected for the apparatus. The apparatus is relatively small in size and light in weight and convenient to install in a variety of locations, and it is compatible electrically with standard 120 volt or 240 volt a.c. lines in the manner previously described. Furthermore, the apparatus uses only about 40 watts of power and therefore is economical to operate. The pest control apparatus finds wide use in such locations as food warehouses, supermarkets, restaurants and feed mills to mention just a few.

As shown in FIG. 4, each transducer 60 and 74 is connected to the source of positive voltage +V when the corresponding power transistor 138 and 176, respectively, is turned off. The corresponding oscillators apply to the transistors square wave signals to turn the transistors off and on at substantially the oscillator signal frequency. As a result, the transducers 60 and 74 are driven or oscillated by these signals, and the transducers are driven by signals having a frequency different from the natural frequency of the corresponding transducer.

In particular, potentiometers 126 and 166 of the corresponding oscillators are set to apply square wave signals to transducers 60 and 74, respectively having a frequency about 1 to 3 percent greater than the natural oscillation frequency. The transducers are driven at frequencies above their natural frequencies to avoid preducing output waves at a frequency less than about 20 kilohertz which is about the threshold frequency below which the effect on pests such as rodents may begin to be less effective. The resulting frequencies will never be below the transducer resonant or natural frequency which serves as a lower limit or stabilizer. In addition, timer 186 serves to turn the oscillators on and off at a predetermined rate, and according to a preferred mode of the present invention the oscillators are on about 60 percent of the time and off about 40 percent of the time under control of timer 184. In the circuit shown in FIG. 4, the output square wave from terminal 3 of timer 184 has a frequency of about 0.25 hertz.

As a result of the foregoing, the pest control apparatus provides a composite output in the form of a random pattern of harmonics in the ultrasonic frequency range which is normally inaudible to humans and intolerable by pests such as rodents and the like. In particular, the provisions of two transducers which most of the time will be providing output sound waves of slightly different frequencies will give rise to variation in amplitude known as beats. Each transducer, being driven at a frequency slightly greater than its natural frequency of oscillation will behave in a manner seeking or hunting for its natural frequency. This gives rise to a peaking effect as the transducer near its natural or resonant frequency, and the foregoing is similar to the wowing phenomenon in broadcast communications where unstable frequencies give rise to variations in sound. Another illustration of the foregoing phenomenon is a mis-tuned radio receiver which is seeking or hunting the resonant frequency at which it normally would be tuned, the receiver cycling back and forth about the resonant frequency and exhibiting a momentary sharp increase or peaking of amplitude each time the natural frequency is reached momentarily. As each transducer hunts or seeks its natural or resonant frequency, but never stabilizing there, harmonics of the instantaneous transducer frequency also are produced. The random nature of the output pattern provided by the foregoing is furthered by the operation of timer 184 which turns the oscillators on and off at a predetermined rate. In addition, the provision of two transducers provides a relatively more potent noise level or amplitude, for example about 120 decibels as compared to about 90-95 decibels for a single transducer device.

The foregoing is enhanced by the mounting and relative locations of the transducers. The resilient or floating nature of the mounting of transducers 60 and 74 to supporting element 26 is believed to contribute to the peaking effect. Also, the location of the button or disc-shaped transducer 74 within the ring-shaped transducer 60 results in output vibrations from the center transducer driving the surrounding transducer which augments the foregoing random behavior. Positioning the outer end face of transducer 74 axially inwardly of the outer end face of transducer 60 a small distance, such as 1/16 inch, accentuates the foregoing. The central transducer 74, being of the diaphragm type, vibrates in an axial direction producing output vibrations in a relatively straight, concentrated outwardly extending beam or path. The ring transducer 60 vibrates in a radial direction producing an outwardly extending somewhat conical shaped pattern of sound waves guided by reflector 44 and interacting along the central axis region thereof with vibrations from the central transducer.

The square wave output signals on lines 134 and 174 from timers 122 and 162, respectively, purposely are not synchronized so as to contribute further to the foregoing random behavior. The inductors 150 and 182 connected to the transducers 60 and 74, respectively, shift the phase of the square wave signal applied to the transducer. The different magnitudes of resistors 136 and 175 were found to provide the best match to the capacitance of the respective transducers.

The ultrasonic sound waves produced by the apparatus of the present invention are normally inaudible to humans and intolerable by pests such as rodents and the like. The ultrasonic sounds are greatly disturbing and irritating to the rodents, repelling them from the vicinity of the apparatus thereby keeping them away from food, upsetting their mating habits and having a generally deleterious effect on their nervous systems. The apparatus of the present invention, having two transducers and characterized by the random output sound pattern, peaking, noise level increase and other attributes described hereinabove produces the foregoing effects on pests such as rodents and the like very effectively. In addition, the random nature of the output ultrasonic waves produced by the apparatus of the present invention precludes the rodents from ever becoming accustomed to or developing tolerance for the ultrasonic output.

Figure 5:
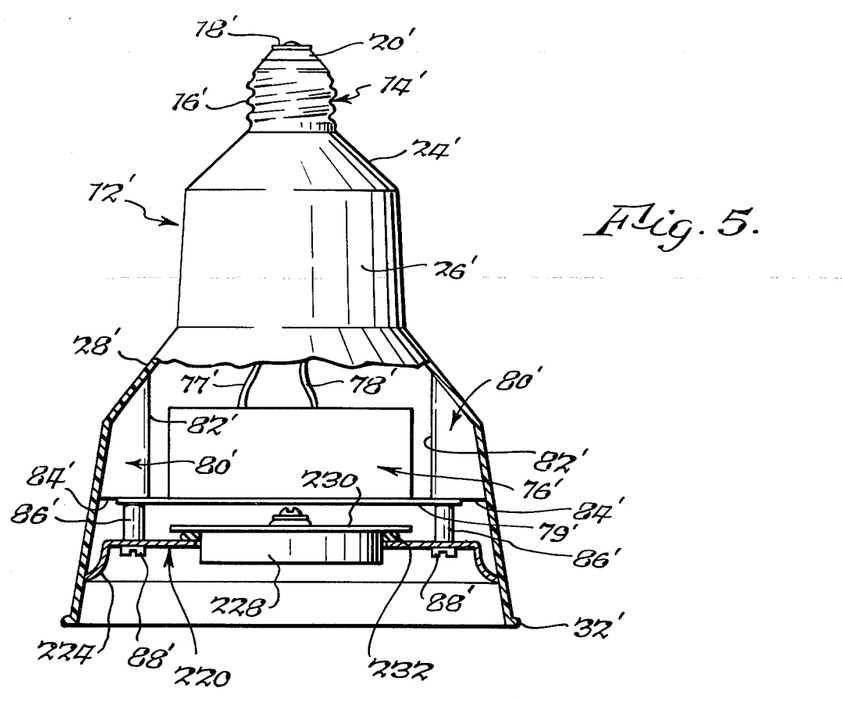
FIG. 5 is a fragmentary elevational view, partly in section, illustrating an alternative transducer and mounting arrangement for the apparatus of FIG. 1.
Figures 6, 7:
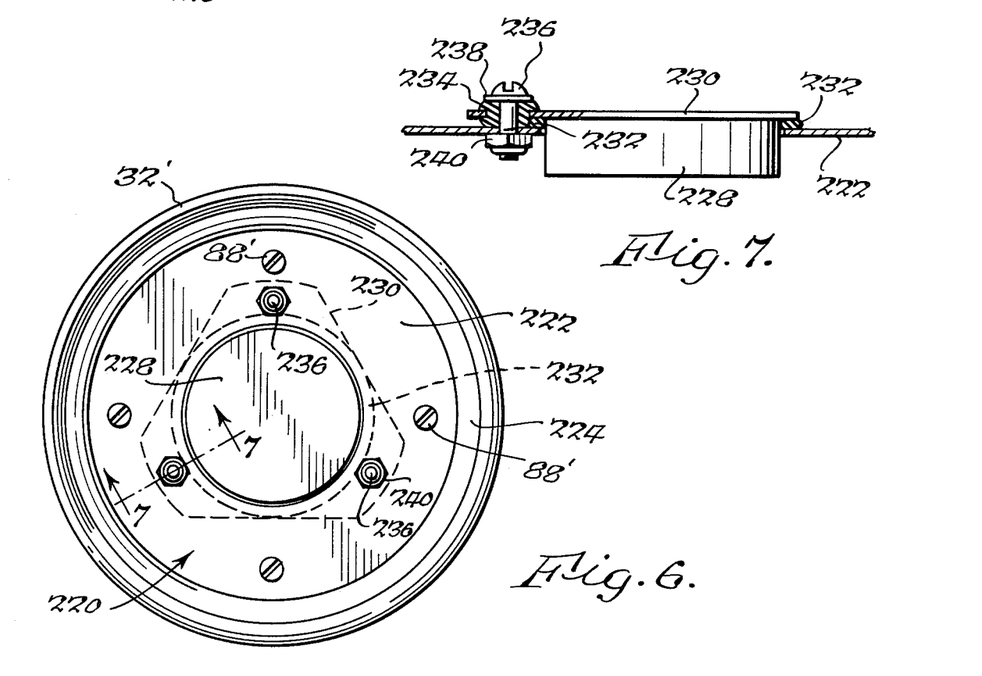
FIG. 6 is a plan view of the apparatus of FIG. 5.
FIG. 7 is a sectional view taken about on lines 7—7 in FIG. 5.

FIGS. 5-7 illustrate apparatus according to another embodiment of the present invention wherein the sound generating means includes a single transducer. The housing and electrical connector in the apparatus of this embodiment are identical to those of the embodiment of FIGS. 1-4 and, accordingly, are identified by the same reference numerals and having a prime designation. The apparatus of FIGS. 5-7 includes an element generally designated 220 which closes the interior of housing 12' and serves as a base or supporting means for other components of the system in a manner similar to that of the supporting element 26 in the embodiment of FIGS. 1-4. The element 220 includes a main body portion 222 which is planar, somewhat disc-shaped, and which is formed to include a circumferential annular rim or flange 224 having an outer surface shaped to conform to the inner surface of the wall portion 30' adjacent the opening thereof in which the element 220 is received. The element has a central opening, preferably circular, in the body portion 222.

The apparatus of this embodiment further comprises a single transducer means generally designated 228 which has a natural frequency of oscillation and functions to provide output sound waves in the ultrasonic range when energized by an appropriate electrical signal in a manner which will be described in detail presently. Transducer 228, like transducer 74 in the embodiment of FIGS. 1-4, is in the form of a disc and is of sufficient axial length such that a portion extends axially beyond the supporting element 220 in a direction toward the end of the housing 12' including bead 32° and a portion thereof extends axially inwardly of supporting element 220 into the interior of the housing 12'. Transducer 228 is of the diaphragm type with the sensitive surface thereof facing outwardly toward the bead 32'. In the apparatus shown, the transducer 228 is provided with a relatively thin backing plate or base 230, preferably of metal. Transducer 228 extends through the central opening in supporting element 220, the backing element 230 is located within the interior of housing 12' and disposed generally parallel to the body portion 222 of supporting element 220, and a sealing means in the form of an O-ring 232 is positioned between the inner surface of body portion 222 and the surface of plate 230 facing surface 222. O-ring 232 has an inner diameter substantially equal to the outer diameter of transducer 228 and serves to provide a gas-tight seal between transducer 228 and supporting element 220 whereby the interior of housing 12' is sealed in gas-tight relationship to the external environment so that the apparatus is safely usable in explosive and inflamable atmospheres. The combination of transducer 228 and backing plate 230 is held in fixed relation to the supporting element 220 by means of a plurality of fastening arrangements including a rubber grommet 234, bolt 236, washer 238 and nut 240. As shown in FIG. 6, the backing plate 230 is generally triangular-shaped, and there are three fastening arrangements each located at an apex of the triangle. A driver means 76' for transducer 228 is supported in housing 12' in a manner similar to driver 76 in the embodiment of FIGS. 1-4.

Figure 8:
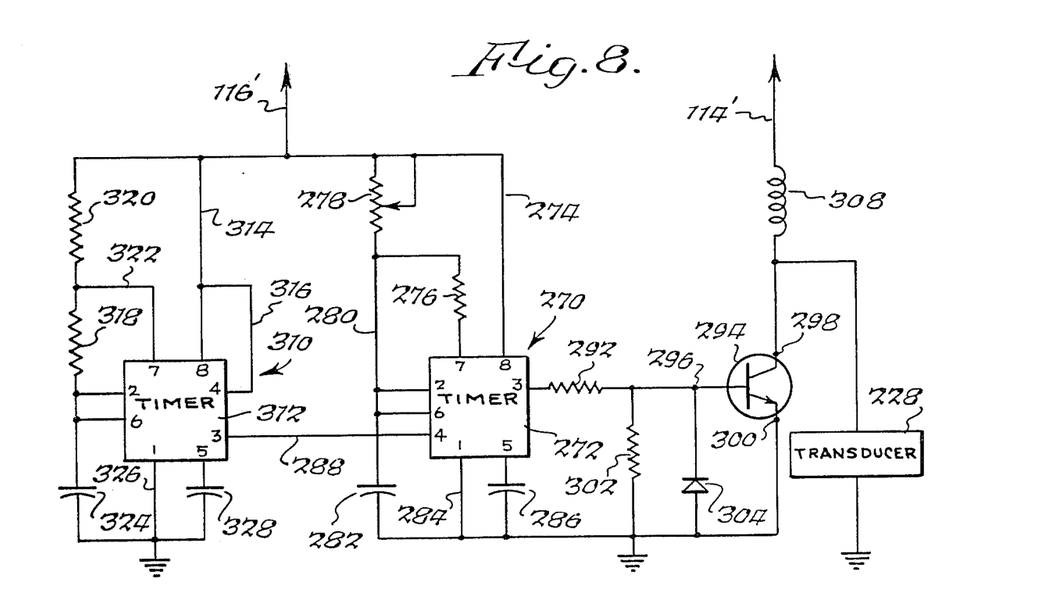
FIG. 8 is a schematic circuit diagram of the sound generating means of the apparatus of FIG. 5.

FIG. 8 shows the circuit and components of driver means 76' for transducer 228, and the driver means is operated from a power supply which can be identical to the power supply shown in FIG. 4. In this connection, the lines 114' and 116' in the circuit of FIG. 8 would be connected to the lines 114 and 116, respectively, of the power supply of FIG. 4. The circuit of FIG. 8 includes oscillator means generally designated 270 drivingly coupled to the transducer 228 for applying to the transducer an electrical signal having a frequency different from the natural or resonant frequency of oscillation of the transducer 228. In particular, oscillator 270 includes an integrated circuit timer 272, which in the present example is the commercially available Signetics NE555 timer, and the various terminal pin numbers of that particular timer are indicated in FIG. 8. Terminal number 8 is connected by a line 274 to line 116' which provides the voltage Vcc. The series combination of a fixed resistor 276 and a variable resistor or potentiometer 278 are connected between the terminals 7 and 8, and the junction of the resistors is connected by a line 280 to the terminal number 2. Terminal 2 also is connected to terminal 6, which, in turn, is connected by a capacitor 282 to the circuit ground or reference point. Terminal 1 is connected by a line 284 to the circuit ground or reference point, and terminal 5 is connected through a capacitor 286 to the circuit reference point. Terminal 4 is connected by a line 288 to another component of driving means in a manner which will be described. The terminal designated 3 of the timer 272 is the output and it is connected to one terminal of a resistor 292, the other terminal of which is connected to a power transistor designated 294 which is of the NPN type having base, collector and emitter terminals 296, 298 and 300, respectively. The other terminal of resistor 292 is connected to base terminal 296 and also is connected through the parallel combination of a resistor 302 and a protective diode 304 to the circuit ground or reference point. Emitter terminal 300 also is connected to the ground. The collector terminal 298 of transistor 294 is connected to one terminal of the transducer 228, the other terminal of which is connected to the circuit ground. The collector terminal also is connected through an inductor 308 to line 114' providing the V positive voltage.

The driver means further includes timing means generally designated 310 connected in controlling relation to the oscillator 270 for controlling the oscillator duty cycle. In particular, the timing means 310 functions like a switch to turn the oscillator 270 on and off at a regular rate whereby the output signal from the oscillator is applied to the transducer in a controlled on and off manner. The timing means 310 includes an integrated circuit timer device 312 which, like the device 272, is the commercially available Signetics NE555 timer. The terminals of the device are numbered corresponding to those of that commercially identified timer. Terminal number 8 is connected by a line 314 to the line 166' which supplies the voltage Vcc. The terminals 4 and 8 are connected together by a line 316. Terminal number 2 is connected to terminal 8 through the series combination of fixed resistors 318 and 320 and line 314. The junction of resistors 318, 320 is connected by a line 322 to the terminal 7. Terminals 2 and 6 are connected together and terminal 6, in turn, is connected through a capacitor 324 to the circuit ground or reference point. Terminal 1 is connected through a line 326 to the circuit ground or reference point, and terminal 5 is connected through a capacitor 328 to the circuit ground or reference point. The output terminal 3 is connected by line 288 to the oscillator 270.

By way of illustration, in the circuit shown, transducer 228 is of the piezoelectric crystal type having a capacitive reactance depending upon the transducer resonant frequency. One transducer found to perform satisfactorily is commercially available from Linden Laboratories under the designation P/N 70140 having a resonant frequency of about 24.6 kilohertz. Resistor 276 has a magnitude of 33 kilohms, resistor 278 is a 100 kilohm potentiometer, capacitor 282 has a magnitude of 330 picofarads, capacitor 286 has a magnitude of 0.01 microfarads, resistor 292 has a magnitude of 1.5 kilohms, resistor 302 has a magnitude of 1 kilohm, and inductor 308 has a magnitude of 10.5 millihenries. Resistor 318 has a magnitude of 220 kilohms, resistor 320 has a magnitude of 100 kilohms, capacitor 324 has a magnitude of 10 microfarads and capacitor 328 has a magnitude of 0.01 microfarads.

The apparatus of FIG. 8 operates in the following manner. Potentiometer 278 is set so that oscillator 270 drives transducer 228 through transistor 294 at a frequency about 1-3 percent greater than the natural or resonant frequency of transducer 228 in a manner similar to the circuit of FIG. 4. As a result, there is a peaking in the ultrasonic output as transducer 228 hunts or seeks its natural frequency as explained in connection with FIG. 4. The effect of this frequency hunting and peaking is enhanced by the operation of timer 310 which causes oscillator 270 to be on 60 percent of the time and off 40 percent of the time. In this connection, the square wave output on line 288 has a frequency of about 0.25 hertz. The output ultrasonic waves are normally inaudible to humans and intolerable by pests such as rodents and the like. Thus, the apparatus of FIGS. 5-8 is both highly effective in repelling pests such as rodents and usable in explosive and inflammable atmospheres.

Figures 9, 10:
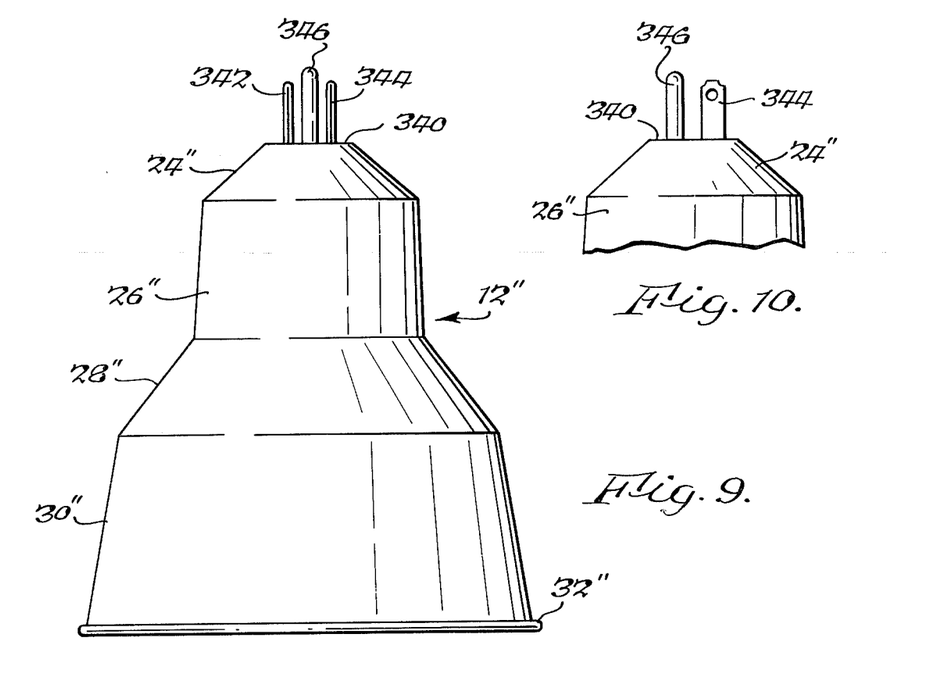
FIG. 9 is a side elevational view illustrating apparatus according to another embodiment of the present invention.
FIG. 10 is a fragmentary elevational view of the apparatus of FIG. 9 rotated ninety degrees about the vertical axis thereof.

FIGS. 9 and 10 illustrate pest control apparatus according to another embodiment of the present invention. The housing is identical to the housings of the previous embodiments and, accordingly, the housing and portions thereof in FIGS. 9 and 10 are identified by the same reference numerals provided with a double prime designation. The apparatus of FIGS. 9 and 10 can include either a pair of transducers as in the embodiment of FIGS. 1-4 or a single transducer as in the embodiment of FIGS. 5-7, both with the corresponding appropriate driver means. In the embodiment of FIGS. 9 and 10, the end 340 of housing 12" opposite the end containing bead 32" is provided with a pair of prongs 342, 344 extending outwardly from the end of the housing in spaced-apart generally parallel relation. Prongs 342, 344 are of length, width and thickness and are spaced corresponding to standard plug type electrical connectors which are inserted by hand into standard electrical outlet receptacles. Prongs 342, 344 are disposed substantially parallel to the longitudinal axis of housing 12" and substantially perpendicular to end surface 340. Housing 12", like the housings in the preceding embodiments, is of electrically insulative material, and in this embodiment the body defining surface 340 serves to insulate the prongs 342, 344 electrically from each other. The prongs 342, 344 are connected by electrical leads (not shown) in the housing 12" to terminals 91 and 94 of the power supply section as in the preceding embodiments. A third prong 346 can be provided spaced from prongs 342, 344 in a manner similar to standard three prong plugs. In this case, prong 346 would be connected by another lead (not shown) to reference terminal 95 of the power supply.

The apparatus of this embodiment is installed simply by grasping housing 12" by hand and moving prongs 342, 344 into corresponding openings of a conventional socket found on walls or ceilings of buildings and the like. When the prongs are moved or inserted into place in the socket slots or openings, the apparatus is connected electrically to the supply line and simultaneously mechanically held or supported as in the previous embodiments. Accordingly, the apparatus of this embodiment having a prong type electrical connector fixed to one end of the housing has all the advantages of the other embodiments. In all embodiments, the apparatus is of a size and weight making it convenient and easy to handle and install, for example the longitudinal distance from connector portion 18 to bead 32 being in the neighborhood of ten inches.

It is therefore apparent that the present invention accomplishes its intended objects. While several embodiments of the present invention have been described in detail, this is for the purpose of illustration, not limitation.

I claim:

1. Apparatus for generating and radiating ultrasonic sound waves for the control of pests comprising:
   (a) an elongated housing having two ends;
   (b) sound generating means carried by said housing adjacent one end thereof; said sound generating means comprising transducer means having a natural frequency of oscillation for providing sound waves when driven by an electrical signal, said sound waves being in a frequency range normally inaudible to humans and intolerable by pests such as rodents and the like, said sound generating means including driver means operatively connected to said transducer means for applying to said transducer means an electrical signal having a frequency different from the natural frequency of said transducer means thereby causing said transducer means to provide said output sound waves in a varying pattern of frequencies with amplitude peaking;
   (c) said sound generating means being positioned to direct said output sound waves outwardly away from said one end of said housing;
   (d) an electrical connector fixed to the other end of said housing and integral with said housing adapted to be inserted manually in a standard electrical outlet receptacle commonly found in buildings and the like, said connector comprising first and second portions of electrically conductive material on said end of said housing and separated by insulative material, there being mechanical engagement between said connector and the outlet receptacle to mechanically support said housing in the outlet;
   (e) first and second electrical conductor means for connecting said first and second portions, respectively, of said connector electrically to said sound generating means; and
   (f) said connector when inserted in an outlet providing for supply of electric current to said sound generating means and simultaneously providing for mechanical support for said housing.

2. Apparatus according to claim 1, wherein said electrical connector is generally cylindrical in shape having a wall of electrically conducting material, threads on the outer surface of said wall, a region of electrically conducting material on the outer end of said connector and insulative material between said region and said cylinder wall.

3. Apparatus according to claim 1, wherein said electrical connector comprises two prong elements of electrically conducting material extending from said housing end in spaced generally parallel relation, said prong elements being generally parallel to the longitudinal axis of said housing and separated by insulative material.

4. Apparatus for generating and radiating ultra-sonic sound waves for the control of pests comprising;
   (a) an elongated housing having two ends;
   (b) sound generating means carried by said housing adjacent one end thereof, said sound generating means comprising at least one transducer means for providing sound waves when driven by an electrical signal, said sound waves being in a frequency range normally inaudible to humans and intolerable by pests such as rodents and the like;
   (c) said transducer means comprising a single transducer having a natural frequency of oscillation and oscillator means drivingly coupled to said transducer for applying to said transducer an electrical signal having a frequency different from the natural frequency of said transducer so as to provide said output sound waves in a varying pattern of frequencies with amplitude peaking;
   (d) said sound generating means being positioned to direct said output sound waves outwardly away from said one end of said housing;
   (e) an electrical connector fixed to the other end of said housing adapted to be inserted manually in a standard electrical outlet receptacle commonly found in buildings and the like; and
   (f) electrical conductor means for connecting said connector electrically to said sound generating means;
   (g) whereby when said connector is inserted in an outlet electric current is supplied to said sound generating means and said housing is supported mechanically by the outlet.

5. Apparatus according to claim 4, further including timing means connected in controlling relation to said oscillator means for switching said oscillator means on and off at a controlled rate.

6. Apparatus for generating and radiating ultra-sonic sound waves for the control of pests comprising:
   (a) an elongated housing having two ends;
   (b) sound generating means carried by said housing adjacent one end thereof, said sound generating means comprising at least one transducer means for providing sound waves when driven by an electrical signal, said sound waves being in a frequency range normally inaudible to humans and intolerable by pests such as rodents and the like;
   (c) said transducer means comprising first and second transducers each having a natural frequency of oscillation, first oscillator means drivingly coupled to said first transducer for applying to said first transducer an electrical signal having a frequency different from the natural frequency of said first transducer, and second oscillator means drivingly coupled to said second transducer for applying to said second transducer an electrical signal having a frequency different from the natural frequency of said second transducer;
   (d) said sound generating means being positioned to direct said output sound waves outwardly away from said one end of said housing;
   (e) an electrical connector fixed to the other end of said housing adapted to be inserted manually in a standard electrical outlet receptacle commonly found in buildings and the like; and
   (f) electrical conductor means for connecting said connector electrically to said sound generating means;
   (g) whereby when said connector is inserted in an outlet electric current is supplied to said sound generating means and said housing is supported mechanically by the outlet.

7. Apparatus according to claim 6, further including timing means connected in controlling relation to said first and second oscillator means for switching said first and second oscillator means on and off at a predetermined rate.

8. Apparatus for generating and radiating ultrasonic sound waves for the control of pests comprising:
   (a) an elongated housing having two ends;
   (b) sound generating means carried by said housing adjacent one end thereof, said sound generating means comprising at least one transducer means for providing sound waves when driven by an electrical signal, said sound waves being in a frequency range normally inaudible to humans and intolerable by pests such as rodents and the like;
   (c) said transducer means comprising first and second transducers, one of said transducers being generally annular in shape and the other of said transducers is generally disc-shaped and positioned within said one transducer;
   (d) said sound generating means being positioned to direct said output sound waves outwardly away from said one end of said housing;
   (e) an electrical connector fixed to the other end of said housing adapted to be inserted manually in a standard electrical outlet receptacle commonly found in buildings and the like, there being mechanical engagement between said connector and the outlet receptacle to mechanically support said housing in the outlet;
   (f) electrical conductor means for connecting said connector electrically to said sound generating means; and
   (g) said connector when inserted in an outlet providing for supply of electric current to said generating means and simultaneously providing for mechanical support for said housing.

9. Apparatus for generating and radiating ultrasonic sound waves for the control of pests comprising:
   (a) an elongated housing having two ends;
   (b) sound generating means carried by said housing adjacent one end thereof; said sound generating means comprising first and second transducers for providing sound waves when driven by an electrical signal, said sound waves being in a frequency range normally inaudible to humans and intolerable by pests such as rodents and the like;
   (c) means for mounting said first and second transducers in a manner providing a limited degree of movement between said first and second transducers and said housing;
   (d) said sound generating means being positioned to direct said output sound waves outwardly away from said one end of said housing;
   (e) an electrical connector fixed to the other end of said housing and integral with said housing adapted to be inserted manually in a standard electrical outlet receptacle commonly found in buildings and the like, said connector comprising first and second portions of electrically conductive material on said end of said housing and separated by insulative material, there being mechanical engagement between said connector and the outlet receptacle to mechanically support said housing in the outlet;
   (f) first and second electrical conductor means for connecting said first and second portions, respectively, of said connector electrically to said sound generating means; and
   (g) said connector when inserted in an outlet providing for supply of electric current to said sound generating means and simultaneously providing for mechanical support for said housing.

* * * * *